Figures 1, 2:
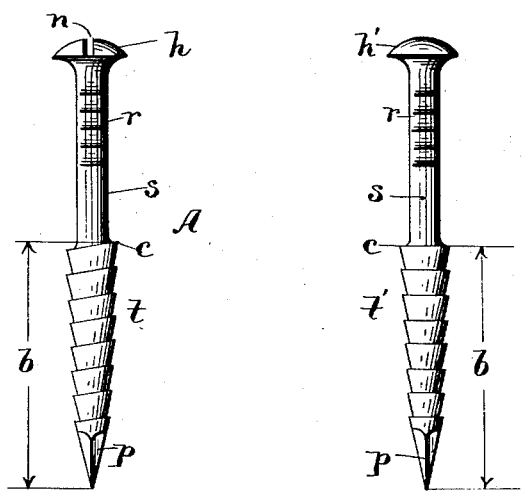

(No Model.)

C. D. ROGERS.
DRIVE SCREW.

No. 364,300. Patented June 7, 1887.

WITNESSES.
Charles H. Hannigan
Joseph Sanford

INVENTOR.
Charles D. Rogers.
by Remington & Henthorn
Attys.

UNITED STATES PATENT OFFICE.

CHARLES D. ROGERS, OF PROVIDENCE, RHODE ISLAND.

DRIVE-SCREW.

SPECIFICATION forming part of Letters Patent No. 364,300, dated June 7, 1887.

Application filed August 6, 1886. Serial No. 210,164. (No model.)

*To all whom it may concern:*

Be it known that I, CHARLES D. ROGERS, a citizen of the United States, residing at Providence, in the county of Providence and State of Rhode Island, have invented certain new and useful Improvements in Drive Screws or Nails; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in wire nails; and it consists of a nail comprising a head, a roughened shank adjacent to the head, a sharpened point, and a conically-shaped screw-threaded or barbed portion extending rearwardly therefrom, and having the base of said cone-shaped portion enlarged or of greater diameter than that of the normal size of the wire, all as will be more fully hereinafter set forth and claimed.

The object of this improvement is to produce a drive screw or nail which will readily displace the fibers in penetrating the wood, and at the same time possess great holding power.

Heretofore, so far as I am informed, drive screws or nails have been provided with a threaded or barbed portion of uniform diameter throughout its length and terminating in a sharpened point.

In the accompanying sheet of drawings, Figure 1 represents a perspective view of my improved drive-screw or screw-nail having a screw-thread; and Fig. 2 is a similar view of the same, the shank being provided with a series of concentric ratchet-shaped grooves in lieu of the helical groove.

Again referring to the drawings, A designates the screw-nail as a whole, $s$ being the plain portion of the shank, roughened at $r$ next to the head.

$h$ indicates a head, which may be of any desired form as common to nails of this class. In order, however, to adapt the nail to be withdrawn, a nick, $n$, or other equivalent means by which the nail may be turned axially, is formed in the head.

The essence of the present invention resides in the novel construction of the screw-threaded or barbed portion $b$ of the nail, said portion commencing at the point $c$, whose diameter considerably exceeds that of the normal size $s$ of the wire, as clearly shown. From this point $c$ the outline of the nail tapers and converges toward the sharpened point $p$, and having the screw-thread $t$ formed thereon; or, as shown in Fig. 2, the taper shank portion $b$ may be provided with a series of ratchet-shaped grooves or barbs, $t'$. A means for producing an enlarged screw-thread thereon is shown and claimed in the patent issued to Harvey, of November 10, 1885, No. 329,900.

It is obvious that other forms of head may be substituted for the ones shown in the drawings without departing from the spirit of the invention. The form of the thread or grooves also may be in like manner modified.

I would not be understood as claiming, broadly, as my invention a screw having a tapering thread; nor do I claim a drive-screw provided with a thread of uniform diameter terminating in a sharpened point; but What I do claim, and desire to secure by Letters Patent of the United States, is—

1. As an improved article of manufacture, a drive-screw having a head adapted to receive a screw-driver or other analogous tool for turning the screw axially, a roughened shank adjacent to said head, a sharpened point, and a screw-thread extending rearwardly from said point in a tapering or divergent direction and terminating in a larger diameter than that of the normal size of the wire, substantially as described, and for the purpose set forth.

2. The nail hereinbefore described, consisting of a head, a roughened shank portion adjacent to said head, a sharpened point, and a series of barbs or corrugations extending rearwardly from said point in a tapering or divergent direction and terminating in a larger diameter than that of the normal size of the wire forming the nail, substantially as shown and described, and for the purpose set forth.

In testimony whereof I have affixed my signature in presence of two witnesses.

CHARLES D. ROGERS.

Witnesses:
WM. R. DUTEMPLE,
GEO. H. REMINGTON.